July 28, 1936.　　C. V. GARDNER　　2,048,692
PARKING BRAKE FOR TRAILERS
Filed April 11, 1934　　2 Sheets-Sheet 1
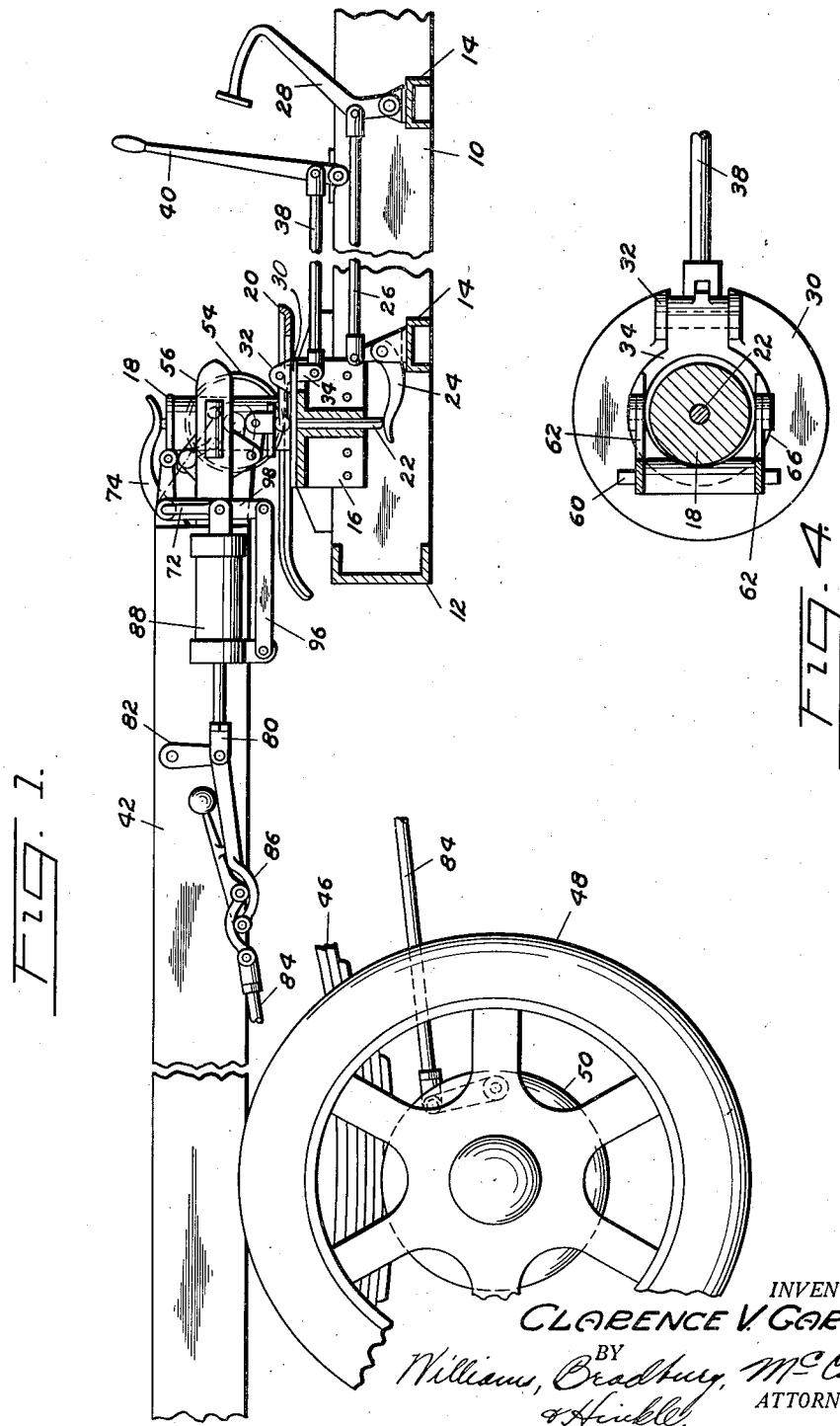
INVENTOR.
CLARENCE V. GARDNER
BY Williams, Bradbury, McCaleb & Hinkle
ATTORNEYS.

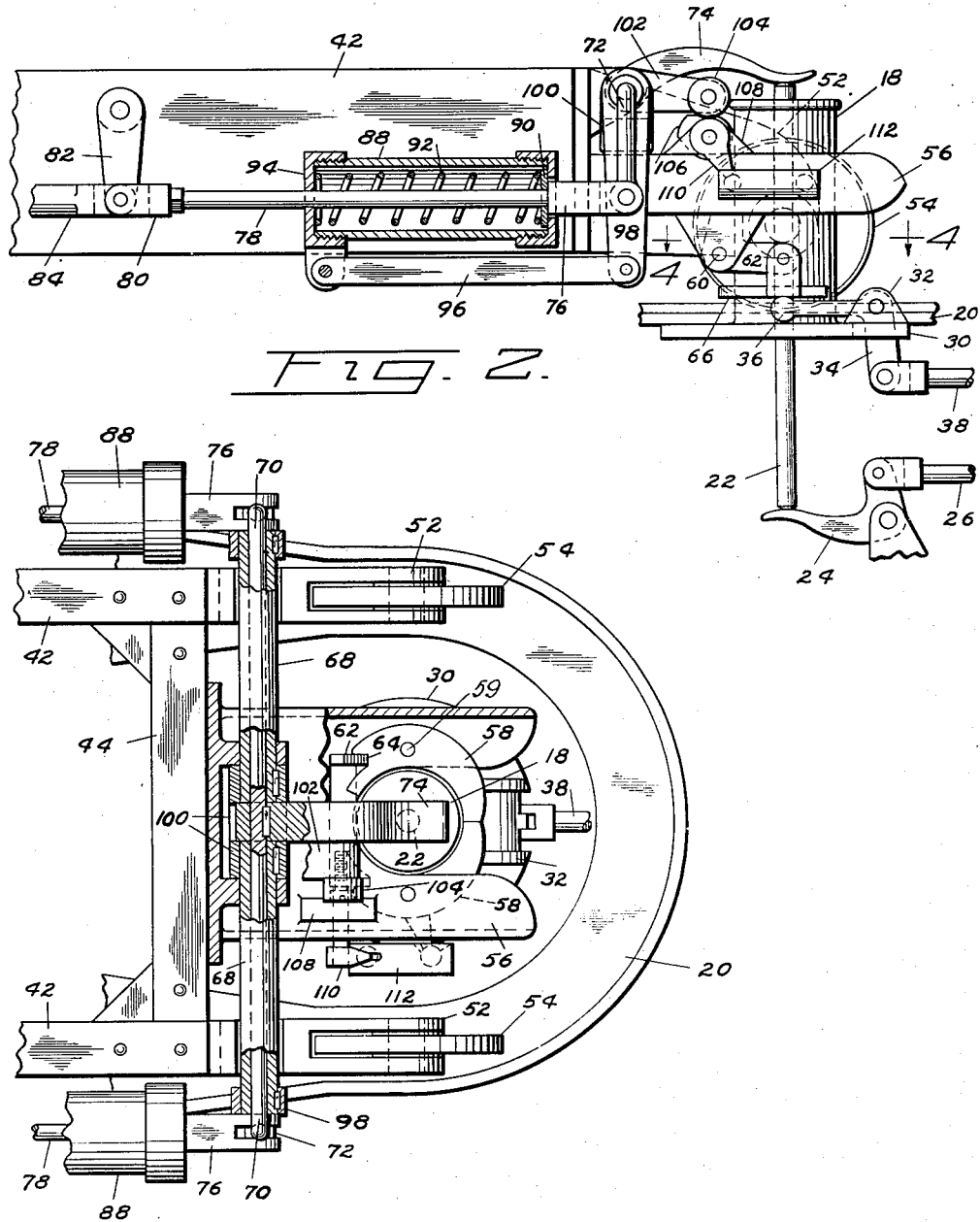

Patented July 28, 1936

2,048,692

UNITED STATES PATENT OFFICE 2,048,692

PARKING BRAKE FOR TRAILERS

Clarence V. Gardner, Detroit, Mich., assignor to Hydraulic Brake Company, Detroit, Mich., a corporation of California Application April 11, 1934, Serial No. 720,014

7 Claims. (Cl. 188—3)

This invention relates to vehicle brakes and more particularly to parking brakes for trailers.

An object of the invention is to provide a parking brake for a semi-trailer automatically operative upon disconnecting the trailer from a tractor.

Another object of the invention is to provide a parking brake for a trailer having means for maintaining the effectiveness of the brakes when applied over an indefinite period of time.

Another object of the invention is to provide a parking brake for a trailer having over-running spring-loaded connections between the brakes and the applying means for the brakes so that any variation in the pressure of the brakes may be taken up by the springs.

Other objects of the invention will appear from the following description taken in connection with the drawings forming a part of this specification, and in which,—

Figure 1 is a side elevation of a tractor with a semi-trailer coupled thereto;

Figure 2 is an enlarged side elevation of the coupling;

Figure 3 is a top plan view of the forward end of a semi-trailer illustrating the parking brake operating mechanism;

Figure 4 is a sectional view substantially on line 4—4, Figure 2.

Referring to the drawings for more specific details of the invention, 10 represents the side members of the chassis frame of a tractor connected by an end member 12 and cross-members 14. The frame also has a relatively heavy cross-member 16 supporting a king pin 18 and a track 20.

The king pin is axially bored for the reception of a thrust pin 22 supported on one end of a bell crank lever 24 fulcrumed on a bracket on one of the cross-members of the frame. The other end of the bell crank lever 24 is connected by a rod 26 to a foot pedal lever 28. The king pin has a flange 30 supporting a bracket 32 on which is fulcrumed a bell crank lever 34. One end of this bell crank lever is bifurcated to straddle the king pin, and the bifurcated portion has spherical ends 36 diametrically disposed to the king pin. The other end of the bell crank lever 34 is connected by a rod 38 to a hand lever 40 pivoted on the frame.

A semi-trailer coupled to the tractor includes a frame comprising side members 42 connected by an end member 44. The rear end of the frame is supported on springs 46 seated on an axle having mounted thereon wheels 48 equipped with brakes 50. The side members of the frame are extended beyond the end member to provide suitable supports 52 for oppositely disposed rollers 54 arranged for travel on the track 20. These rollers facilitate in coupling the trailer to the tractor and support the forward end of the trailer in proper relation to the king pin. When the trailer is coupled to the tractor, the axes of the rollers are diametrally disposed to the king pin so that the rollers may travel in a circle, the center of which is in the axis of the king pin.

Suitably secured to the end member 44 is a coupling 56 including a housing having a bifurcated portion. Corresponding and oppositely disposed jaws 58 are pivotally mounted in the bifurcated portions by pivots 59. These jaws are adapted to embrace the king pin 18. The pivots of the jaws are so positioned that the jaws automatically swing to open position as the king pin is withdrawn from the coupling, and to closed position as the king pin is received, and when in closed position the jaws are locked against displacement by a locking dog.

The locking dog includes a shaft 60 having thereon corresponding bell crank levers 62 adapted to engage notches 64 in the jaws when the jaws are in closed position, and pivotally attached to the bell crank lever is a yoke 66 for the reception of the king pin. When the king pin is embraced by the jaws, the yoke 66 engages the spherical ends 36 on the bell crank lever 34.

When it is desired to uncouple the trailer, the hand lever 40 is operated to move the bell crank lever 34 through an angle, and this movement is transmitted through the yoke 66 to the bell crank levers 62, resulting in disengaging these levers from the jaws 58. The tractor may then be moved free of the trailer, and as the tractor moves away from the trailer the jaws are automatically moved to open position.

The braking system includes a divided sleeve 68 rotatably supported on the coupling 56 parallel to the end member 44 of the frame. This sleeve has therein a rotatable shaft 70 having upon its respective ends corresponding arms 72, and an arm 74 keyed centrally to the shaft between the separate portions of the sleeve 68, and the arm 74 engages the thrust pin 22 when the king pin is embraced by the jaws.

Clevises 76 are pivotally attached to the arms 72, and corresponding rods 78 connect these clevises to clevises 80 pivoted to swinging supports 82 on the side members of the frame, and rods 84 connect the swinging supports to the operating levers of the brakes 50. As shown, the rods 84 have connected therein a toggle 86 which may be manually operated to release the brakes in instances where it is desired to manually move the trailer from its parked position.

Normally, in the operation of the brakes the foot pedal lever 28 is depressed, and this movement of the foot pedal lever is transmitted through the rod 26 to the bell crank lever 24 resulting in moving the lever through an angle and applying force to the thrust pin 22. This movement of the thrust pin is transmitted through the lever 74 to rock the shaft 70 and thereby effectually apply the brakes.

Upon uncoupling the trailer from the tractor it is highly desirable to automatically apply the brakes of the trailer and to leave the brakes applied during such period of time as the trailer may remain parked. It has been found that in devices heretofore employed for this purpose the brakes frequently lose their effectiveness due to changes in temperature and other causes. The present invention seeks to overcome this objection by the provision of a simple means for automatically applying the brakes of a trailer upon uncoupling the trailer from the tractor embodying means for maintaining the brakes effective while the trailer is parked.

In one embodiment of the invention cylinders 88 sleeved on the rod 78 have therein washers 90 seated on the clevises 76 and compression springs 92 interposed between the washer and the heads 94 of the cylinders. The heads 94 of the cylinders are connected by links 96 to arms 98 keyed to the separate portions of the sleeve 68. The separate portions of the sleeve 68 are rigidly connected by a yoke 100 straddling the arm 74. This yoke carries an arm 102 supporting a roller 104 for cooperation with a cam 106 pivoted on a bracket 108 on the coupling 56, and the cam is operated by a lever 110 connected by a link 112 to arm 113 carried by one of the jaws 58.

In operation, assuming that the trailer is coupled to a tractor and it is desired to uncouple, under these conditions the operator actuates the lever 40 to move the bell crank lever 34 through an angle, and this movement of the bell crank lever 34 is transmitted through the yoke 66 to the bell crank levers 62 to disengage these levers from the jaws 58. The operator then speeds up the motor of the tractor, shifts the clutch thereof into low speed gear, and drives the tractor away from the trailer. As the tractor moves away from the trailer, the jaws 58 are automatically opened by the removal of the king pin which causes the jaws 58 to swing about their pivots 59. This movement of the jaws is transmitted through the links 110 and 112 to the cam 106, and as the roller 104 rides up on the lobe of the cam, the arm 102 supporting the roller is moved to rock the sleeve 68 resulting in movement of the arm 98, and this movement of the arm 98 is transmitted through the link 96 to the cylinders 88, resulting in compressing the springs 92 between the head 94 of the cylinder and the washer 90 seated on the clevises 76. Accordingly, the load on the springs 92 is imposed on the brake rods. Hence, any variation of pressure on the brakes will be compensated for by the tension on the spring.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A brake system comprising a rock shaft, a lever for rocking the shaft, an arm on the shaft, a brake structure and a brake rod connecting the arm to the brake structure, a sleeve on the shaft, an arm on the sleeve, a lever for rocking the sleeve, and an overrunning spring-loaded connection between the arm on the sleeve and the brake rod.

2. In a brake system, the combination with a rock shaft, a lever for rocking the shaft, arms on the rock shaft, a pair of brakes, and rods connecting the arms to the brakes, of an auxiliary means for actuating the brakes comprising sleeves on the shaft, means for rocking the sleeves, arms on the sleeves, and spring-loaded overrunning connections between the arms on the sleeves and the rods.

3. In a brake system, the combination with a rock shaft, an actuating lever therefor, arms on the rock shaft, a pair of brakes, and rods connecting the brakes to the arm, of an auxiliary operating means for the brakes comprising sleeves on the shaft, a lever for rocking the sleeves, arms on the sleeves, compression springs on the rods, and means connecting the compression springs to the arms on the sleeves.

4. In a brake system, the combination with a rock shaft, an actuating lever therefor, arms on the rock shaft, a pair of brakes and rods connecting the brakes to the arms, of an auxiliary operating means for the brakes comprising sleeves on the shaft, a lever for rocking the sleeves, arms on the sleeves, cylinders on the rods, compression springs in the cylinders, and linkage connecting the cylinders to the arms on the sleeves.

5. In a brake system for a trailer, the combination with a rock shaft, an actuating lever therefor, arms on the rock shaft, brake structures, rods connecting the brake structures to the arms, and a coupling for the trailer including a pair of movable jaws, of an auxiliary operating means for the brake system comprising sleeves on the shaft, a lever for rocking the sleeves, arms on the sleeves, a cam for actuating the lever, linkage connecting the cam to one of the jaws for concurrent movement, and spring-loaded overrunning connections between the arms on the sleeves and the brake rods.

6. In a brake system for a trailer, the combination of brake mechanism, means for actuating said brake mechanism automatically upon disconnection of said trailer from a tractor vehicle, said last-named means including an over-running, spring-loaded connection, and manually-operated means interposed between said connection and said brake mechanism for rendering said automatic means ineffectual to apply said brake mechanism.

7. In a brake system for a trailer, the combination of brake mechanism, means for operating said brake mechanism when said trailer is disconnected from a tractor vehicle, said means including a resilient connection comprising a housing, a rod having a part in said housing and a spring operatively interposed between said rod and said housing, and additional means whereby said brake mechanism may be operated from a tractor vehicle.

CLARENCE V. GARDNER.